United States Patent
Wunderlich

[11] Patent Number: 6,152,553
[45] Date of Patent: Nov. 28, 2000

[54] MODULAR FURNITURE CONSTRUCTION SYSTEM

[76] Inventor: Dale N. Wunderlich, 1521 Pipher, Manhattan, Kans. 66502

[21] Appl. No.: 09/087,616

[22] Filed: May 29, 1998

[51] Int. Cl.[7] ................................................ A47G 39/00
[52] U.S. Cl. .................................. 312/265.2; 312/265.4; 108/110; 211/187
[58] Field of Search ..................................... 108/107, 108, 108/109, 110; 312/107, 110, 257.1, 265.1, 265.4; 211/187, 190, 194, 208, 207; 403/171, 172

[56] References Cited

U.S. PATENT DOCUMENTS

| | | | |
|---|---|---|---|
| 1,563,799 | 12/1925 | Scherer | 108/107 |
| 2,065,133 | 12/1936 | Heppenstall | 312/108 |
| 3,197,822 | 8/1965 | Herrschfaft | 211/184 |
| 3,346,316 | 10/1967 | Morioka et al. | 312/257 |
| 3,480,155 | 11/1969 | Ferdinand et al. | 211/190 |
| 3,788,242 | 1/1974 | Hassel et al. | 108/111 |
| 3,881,428 | 5/1975 | Klecki | 108/27 |
| 3,948,581 | 4/1976 | Helman et al. | 312/198 |
| 4,432,590 | 2/1984 | Lawrence et al. | 312/257 |
| 4,607,754 | 8/1986 | Wolf | 211/183 |
| 5,435,644 | 7/1995 | Schuh et al. | 312/257.1 |

FOREIGN PATENT DOCUMENTS

| | | | |
|---|---|---|---|
| 1416580 | 9/1965 | France | 211/194 |
| 1465101 | 1/1966 | France | 312/111 |
| 1522713 | 3/1968 | France | 108/107 |
| 2755642 | 6/1979 | Germany | 312/263 |
| 619787 | 4/1961 | Italy | 108/107 |

*Primary Examiner*—Peter M. Cuomo
*Assistant Examiner*—Jerry A. Anderson
*Attorney, Agent, or Firm*—Kenneth W. Iles

[57] ABSTRACT

A system of modular furniture construction includes basic elements of corner posts, intermediate posts, and a corner leg converter post, which each have longitudinal slots to receive panels and a rows of equally spaced holes for retaining fasteners that hold shelves in place. Vertical bores in each end of the center posts and intermediate posts allow connecting rods to couple two or more posts vertically together to form longer post members. Quite different and disparate types of furniture may be readily assembled from these elements, including, for example, desks, computer work stations, open shelves, entertainment centers, and so forth.

8 Claims, 8 Drawing Sheets

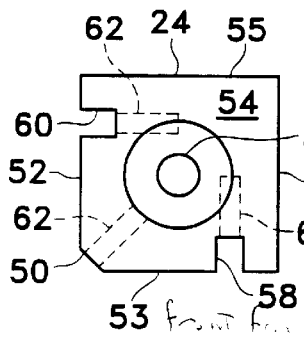
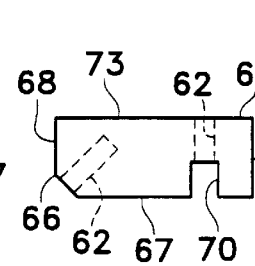
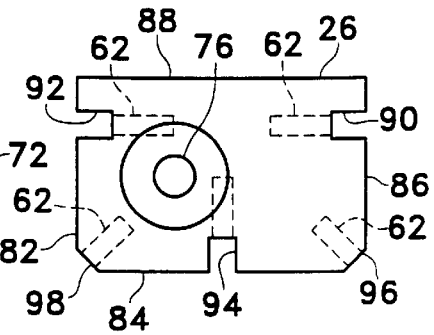
FIG. 5  FIG. 7  FIG. 9
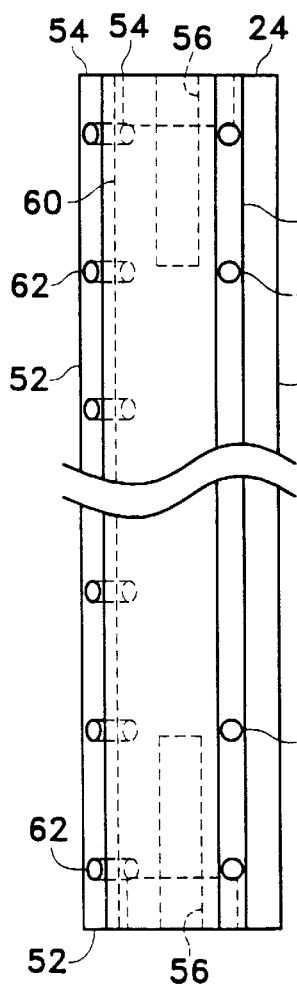
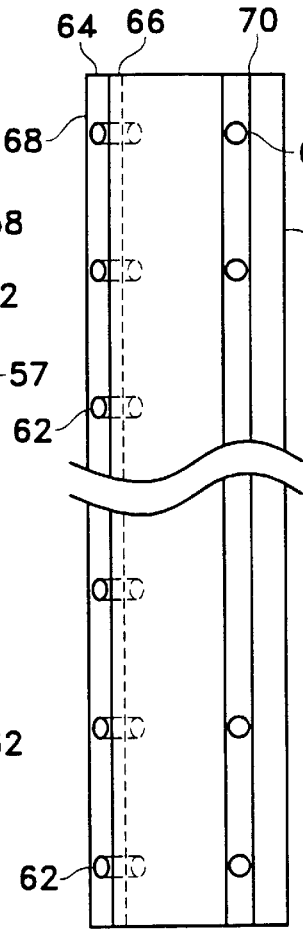
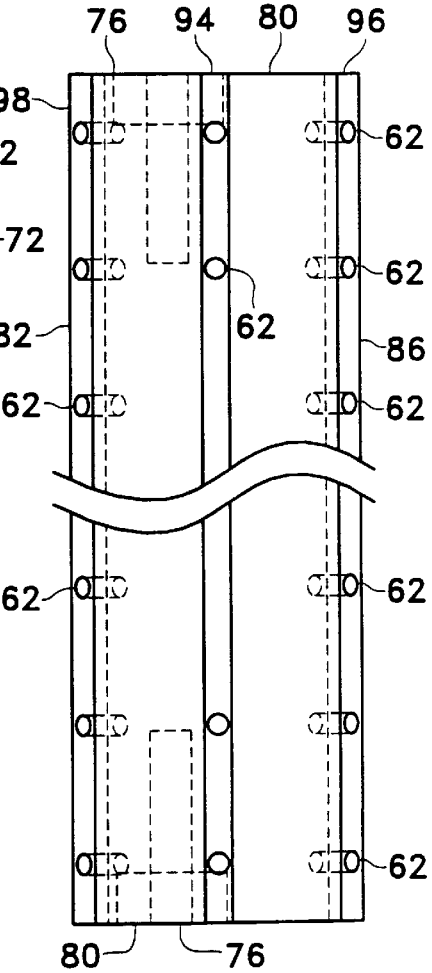
FIG. 6  FIG. 8  FIG. 10

MODULAR FURNITURE CONSTRUCTION SYSTEM

BACKGROUND OF THE INVENTION

1. Field of the Invention

The present invention is related to an apparatus for providing a furniture system that can be readily configured into numerous forms of furniture, for example, free-standing and wall mounted cabinets, desks, open shelves and the like. More particularly, the present invention is related to a furniture system that employs a few repeatable elements that can be combined in a variety of ways to provide different types of furniture that have the appearance of custom furniture.

2. Description of Related Art Including Information Disclosed Under 37 C.F.R. Sections 1.97–1.99

Furniture is often designed for a specific purpose and is manufactured and assembled at the factory and is shipped whole. Sometimes furniture is built and assembled on site to custom dimensions and designs, or is cut and partially assembled in a factory or shop, with final construction and assembly on site. Other types of furniture are sold in kits consisting of pre-cut parts that are assembled on site, typically by homeowners. Examples of this type of furniture include computer workstations, television tables, bookcases, and the like. Such kits are typically made from inexpensive press board and have an inexpensive poorly finished appearance that is not nearly as pleasing as factory assembled or custom furniture.

Furniture kits are typically designed to be assembled into one type of piece of a certain size. For example, a television table kit has no parts that could readily be used to make a bookshelf, computer workstation, and so forth.

Furniture kits designed to provide some flexibility in shipping and set-up have been designed. U.S. Pat. No. 3,346,316, issued to Morioka et al. discloses a wall-mounted cabinet kit having a back panel for mounting to a wall, and frame members for holding shelves, and divider panels. Morioka et al. '316, however, can only result in a cabinet of predetermined size. U.S. Pat. No. 3,788,242, issued to Hassell et al. discloses a shelving system in which stub leg members are welded to each shelf and these stub leg members are connected to longer spacer members on site to separate the shelves. This approach saves shipping space, but can only result in shelves, and then, only shelves of predetermined size and spacing. U.S. Pat. No. 3,881,428, issued to Klecki on May 6, 1975 discloses a modular shelf system having metal hollow T-shaped legs with sets of four holes that are engaged by small tangs on shelf-anchoring brackets that secure metal shelves to the legs at user-selected levels. This kit too can only be used to build a single type of furniture, in this case open shelves. Another shelf system is disclosed in U.S. Pat. No. 3,948,581, issued to Helman et al. on Apr. 6, 1976. It too can only be used to make open shelves.

These and other types of modular or kit type furniture are typically a sole use kit. The basic structural parts of these kits cannot be used for any other purpose. Time, materials, capital, and labor could be saved if the structural members could be used in other furniture designs without modification. When these kits are assembled, the resulting furniture looks like a kit and does not have the pleasing appearance of custom furniture.

Therefore, there is a need for a modular furniture construction system whose structural members can be used for several different types of furniture without modification; that saves time, materials, capital, and labor; and that has the appearance of custom furniture when assembled.

SUMMARY OF THE INVENTION

Accordingly, it is a primary object of the present invention to provide a modular furniture construction system whose structural members can be sued for several different types of furniture without modification.

It is another object of the present invention to provide a modular furniture construction system that saves time, materials, capital, and labor.

It is another object of the present invention to provide a modular furniture construction system that has the appearance of custom furniture when assembled.

These and other objects of the present invention are achieved by providing a modular furniture construction system that comprises six principal elements, which are corner posts, intermediate posts, rails, panels, convertor posts, and shelves. The corner posts and their variations, including converter posts, and intermediate posts both have equally spaced apertures throughout their lengths for accepting fixtures for holding shelves, rails, panels, and so forth. The corner posts and intermediate posts can be any desired length, but more importantly, similar posts can be connected together to provide functionally a single unit post for making larger systems or furniture pieces.

Examples of furniture that can be made with the present modular furniture construction system include, for example, formal desks, open shelves, enclosed shelves, office computer workstations, cabinets, and retail display cases, such as those used by jewelers or cosmetic salesman. This flexibility arises from the ability to utilize solid thin or thick panels, raised panels, glass panels, and the like for the exterior surfaces of the completed furniture, while retaining the same structure of the skeletal members, namely, the corner posts, intermediate posts, and rails.

Other objects and advantages of the present invention will become apparent from the following description taken in connection with the accompanying drawings, wherein is set forth by way of illustration and example, the preferred embodiment of the present invention and the best mode currently known to the inventor for carrying out his invention.

BRIEF DESCRIPTION OF THE DRAWINGS

FIG. 5 is an end elevation of a corner post according to the present invention.

FIG. 6 is a side elevation of the corner post of FIG. 5.

FIG. 7 is an end elevation of an alternative embodiment of the corner post of FIG. 5.

FIG. 8 is a side elevation of the corner post of FIG. 7.

FIG. 9 is an end elevation of an intermediate post according to the present invention.

FIG. 10 is a side elevation of the intermediate post of FIG. 7.

DETAILED DESCRIPTION OF THE PREFERRED EMBODIMENTS

As required by the Patent Statutes and the case law, the preferred embodiment of the present invention and the best mode currently known to the inventor for carrying out the invention are disclosed in detail herein. The embodiments disclosed herein, however, are merely illustrative of the invention, which may be embodied in various forms. Therefore, specific structural and functional details disclosed herein are not to be interpreted as limiting, but merely to provide the proper basis for the claims and as a representative basis for teaching one skilled in the art to which the invention pertains to make and use the apparatus disclosed herein as embodied in any appropriately specific and detailed structure.

Figure 1:
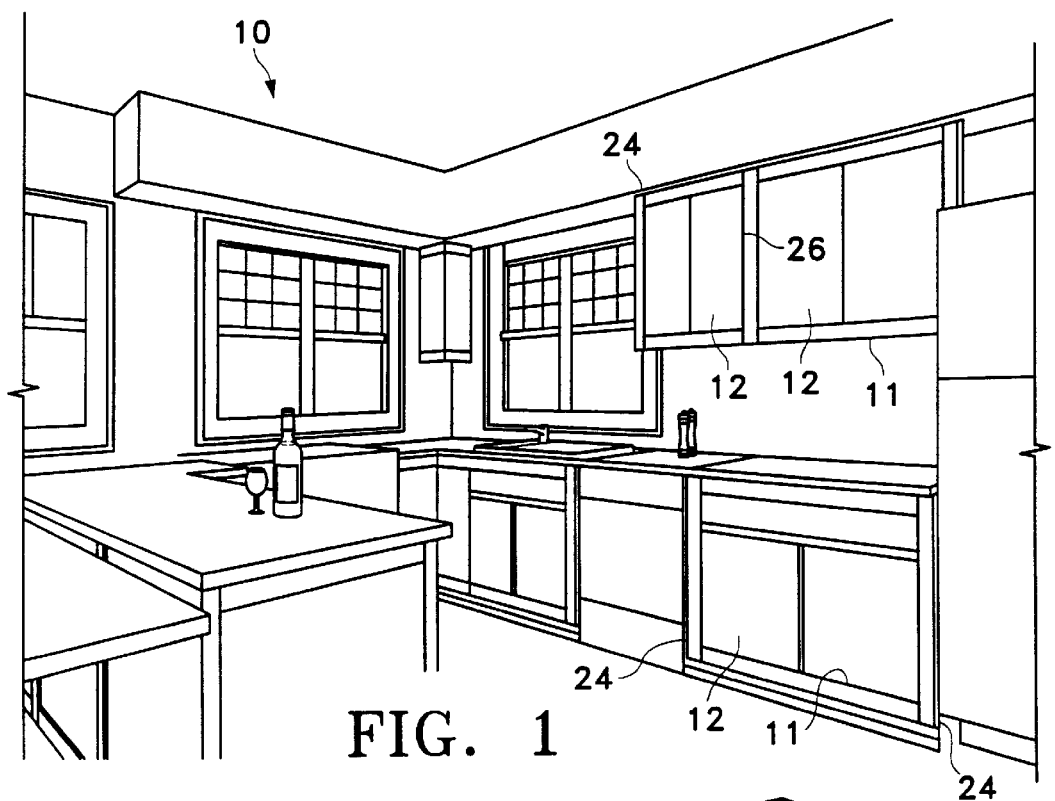
FIG. 1 is a perspective view of a set of kitchen cabinets made according to the present invention, shown mounted on walls.

Referring now to FIG. 1 there is shown a set of kitchen cabinets 11 made according to the modular furniture construction system 10, which have been installed on the walls of the kitchen. The modular furniture construction system 10 is a knock down system that enables the system 10 to be built, stored, and shipped in a very small space. The customer can customize the system 10 as need change with minimum disruption. As shown, the door panels 12 are simple flat panels.

Figure 2:
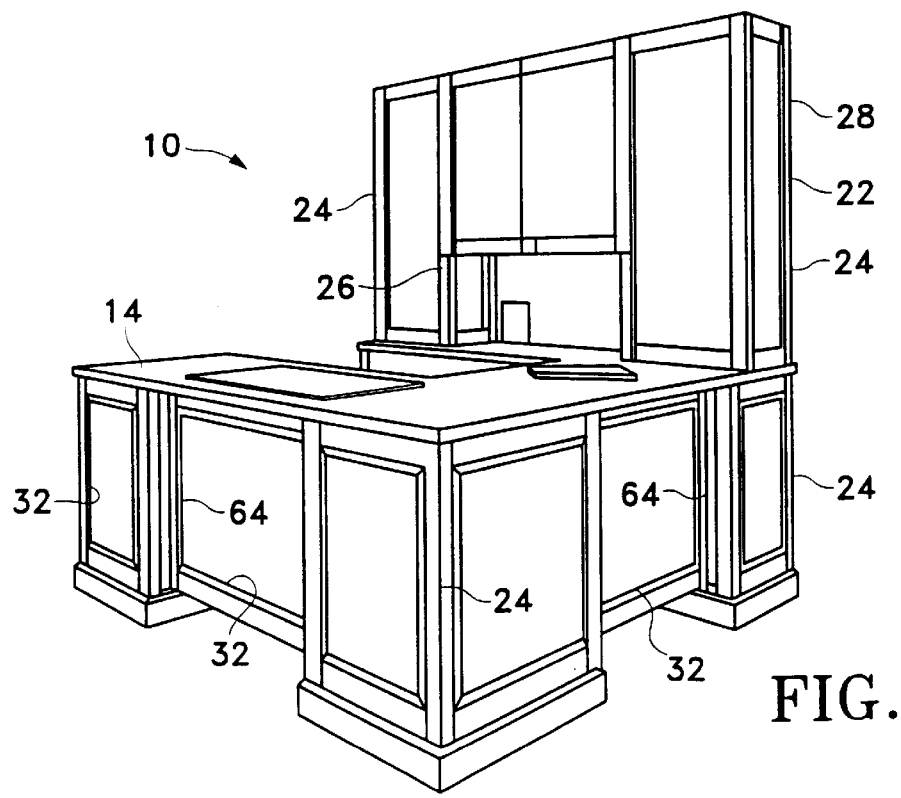
FIG. 2 is a perspective view of a desk made according to the present invention.

Referring now to FIG. 2, there is shown an executive desk 14 utilizing raised panels 16 for enclosing the framework. The executive desk 14 utilizes the modular furniture construction system 10 and has the favorable characteristics of the kitchen cabinets 11.

Figure 3:
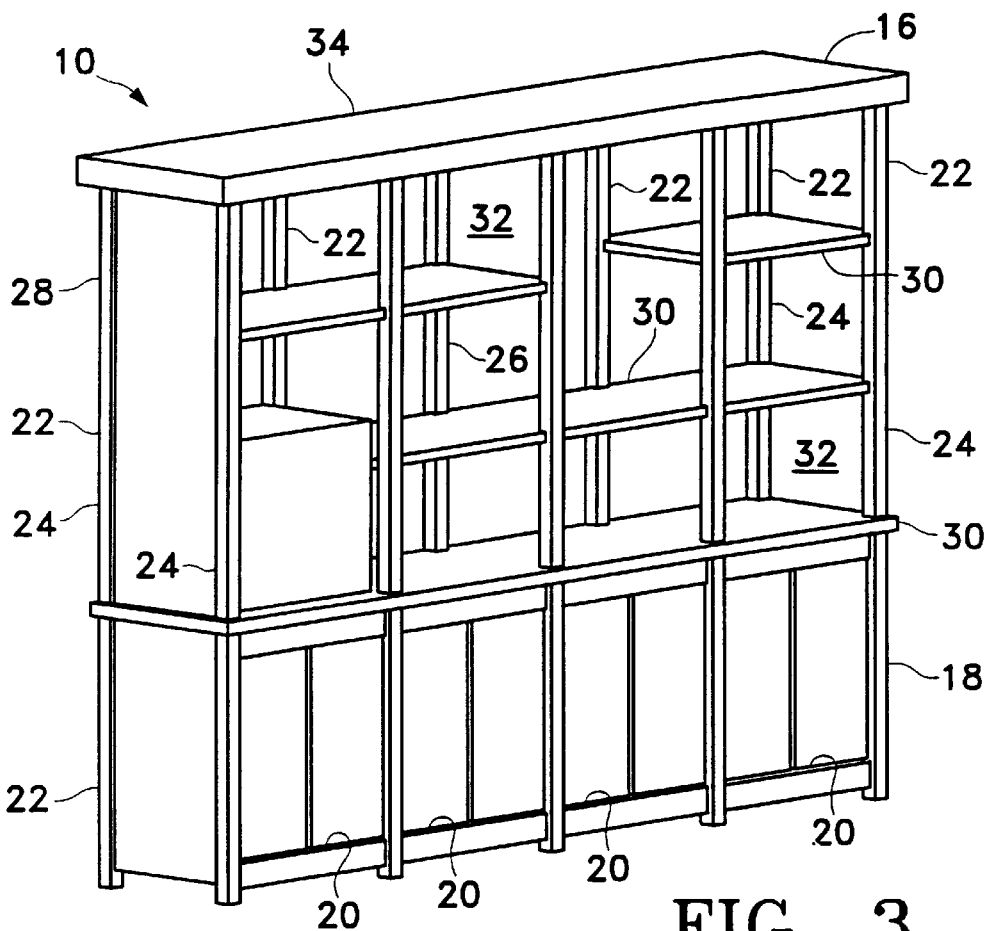
FIG. 3 is a perspective view of an entertainment center having open shelves and doors made according to the present invention.

Referring now to FIG. 3, there is shown an entertainment center 16 made according to the modular furniture construction system 10 comprising a lower enclosed section 18 that includes a number of hinged doors 20 on the front. Above the enclosed lower section 18 are vertical members or posts 22, which consist of corner posts 24 and intermediate posts 26, which form a skeleton of the upper section 28. The vertical members 22 run from the floor 23 to the top shelf 34, but are formed from shorter connected members in a manner discussed below. Any desired number of shelves 30 can be removably attached to the vertical members 22. The shelves 30 may be of different lengths so that they fit between two or more adjacent vertical members 22, as desired by the customer. The panels 32 enclose the ends and back of the entertainment center 16. Each panel 32 includes a bore partially through the panel for receiving a cam-lock fastener. A top shelf 34 provides a finished appearance and enhanced structural rigidity. The modular furniture construction system 10 allows the entertainment center 16 to be scaled for the size of the room and to be reconfigured into smaller units if the room is too small for a large entertainment center.

Figure 4:
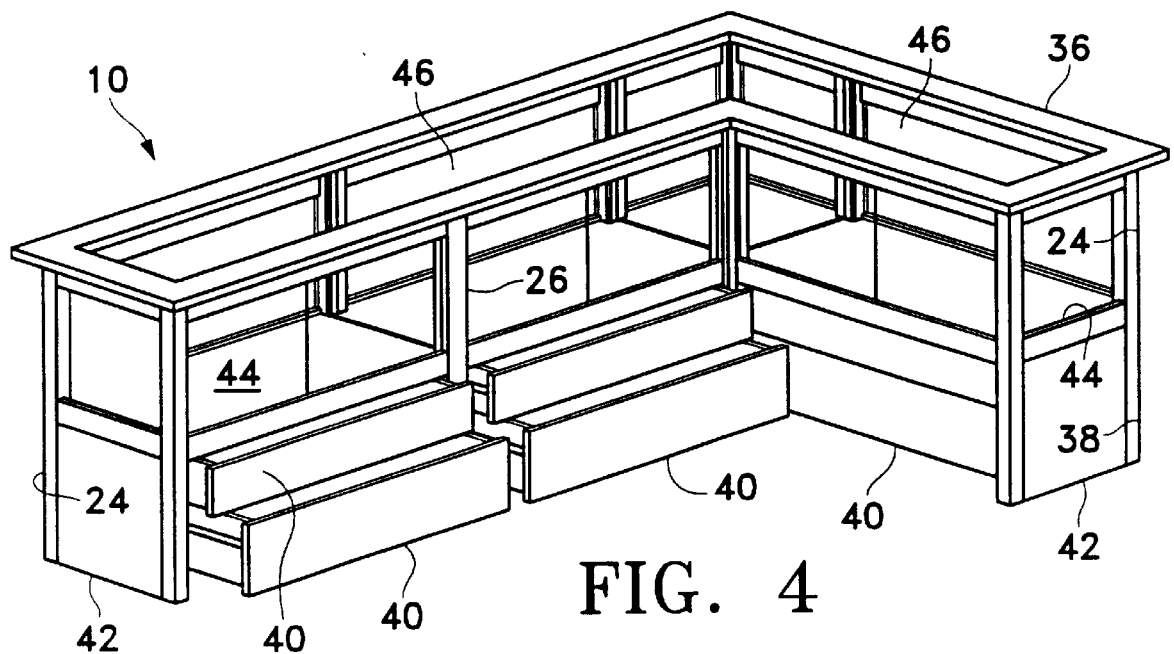
FIG. 4 is a perspective view of a retail display case made according to the present invention.

Referring now to FIG. 4, there is shown a retail display case 36 made according to the modular furniture construction system 10 having a lower section 38 that houses drawers 40, which are enclosed on the sides by the panels 42. The shelves 44 above the drawers 40 provide a surface for displaying goods and the glass counter 46 allow customers to easily view the merchandise on the shelves 44 and provide a surface for closely viewing merchandise selected by the customer. As in the other units, a plurality of vertical members 22 form a skeleton frame for retaining the other elements of the modular furniture construction system 10.

As the embodiments illustrated in FIGS. 1–4 illustrate, the modular furniture construction system 10 can be utilized to provide numerous types of furniture while using the same basic members without any change in them. The structure of specific structural members will be discussed in detail below.

Referring now to FIGS. 5 and 6, there is shown a corner post 24 according to the modular furniture construction system 10. The corner post 24 is an elongated member having a substantially square cross section with one cut-off corner or chamfered edge 50, which is preferably cut off at a 45° angle to each of the edges 52, 53 that adjoin the chamfered edge 50 to form an inner edge, that is, the chamfered edge 50 will always be on the inside of a furniture unit made from this system. The corner post 24 includes a front face 53, a left-hand face 52, a rear face 55, and a right-hand face 57. Each end 54 of the corner post 24 includes a central longitudinal bore 56, which penetrates the corner post about 75 mm. Each corner post 24 includes a longitudinal slot 58 in the edge 53 and a longitudinal slot 60 along the edge 52. These slots 58, 60 run throughout the length of the corner post 24 for a distance sufficient to accommodate the width of a thin panel to be inserted into them and each receives a plurality of bores 62 preferably spaced 32 mm apart and having a depth of about 6–8 mm. A plurality of bores 62 are also drilled into the chamfered edge corner 50. Thus, the corner post 24 includes three vertical lines of bores 62, with each line having bores 62 at the same level.

Referring to FIGS. 7 and 8, there is shown a corner post convertor member 64, which is an elongated member having a substantially rectangular cross section with a chamfered edge 66 at the intersection of the faces 67, 68. The corner post convertor member 64 includes a front face 67, a right-hand face 72, a rear face 73, and a left-hand face 68. A slot 70 is formed along and perpendicular to the face 67 adjacent to the face 72. A plurality of bores 62 is drilled along the length of the slot 70, which matches the bores 62 described in relation to FIGS. 5 and 6 above. A plurality of bores 62 is also drilled into the chamfered edge 66 perpendicular to the beveled face formed by the chamfered edge 66, also as discussed and shown in FIGS. 5–6. In use, the rear face 73 is fixed to either the right-hand face 57 or the rear face 55 of a corner post 24 to allow shelves 30 or panels 32 to be attached to faces of the corner posts 24 that would otherwise be flat and would not accept these elements.

Referring to FIGS. 9–10, there is shown an intermediate post according to the present invention, which is used when a shelf or counter top needs additional support or a furniture unit is designed to be wider than one shelf will permit. Each intermediate post 26 resembles one corner post expanded by a mirror image of itself, as can be seen by comparing FIGS. 5 and 9. The intermediate post 26 includes a vertical bore 76 in each end 80 of the same dimensions as the vertical bore 56 in FIGS. 5 and 6. The vertical bore 76 is in the same location relative to the closest edges of the intermediate post 26 as in the corner post 24. The intermediate post 24 is an elongated member having a substantially rectangular cross section having a left-hand face 82, a front face 84, a right-hand face 86, and a rear face 88. A vertical slot 90 is cut into the face 86 and adjacent to the face 88. A vertical slot 92 is cut into the face 82 adjacent to the face 88. A vertical slot 94 is cut into the face 84 midway between the faces 82 and 86. A chamfered edge 96 is formed at the intersection of faces 84 and 86 at 45° to both of the two faces and a chamfered 98 is similarly formed at the intersection of the faces 82 and 84, with each chamfered edge 96 and 98 forming inner edges, that is, these surfaces will always be on the interior of any furniture piece made from this system. A plurality of aligned bores 62 is drilled into the slots 90, 92, and 94 and the chamfered edges 96 and 98, as discussed above, FIGS. 5–6.

Figure 11:
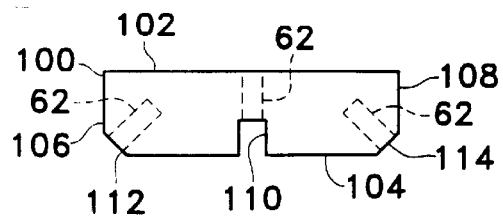
FIG. 11 is an end elevation of an alternative embodiment of the intermediate post of FIG. 9.
Figure 12:
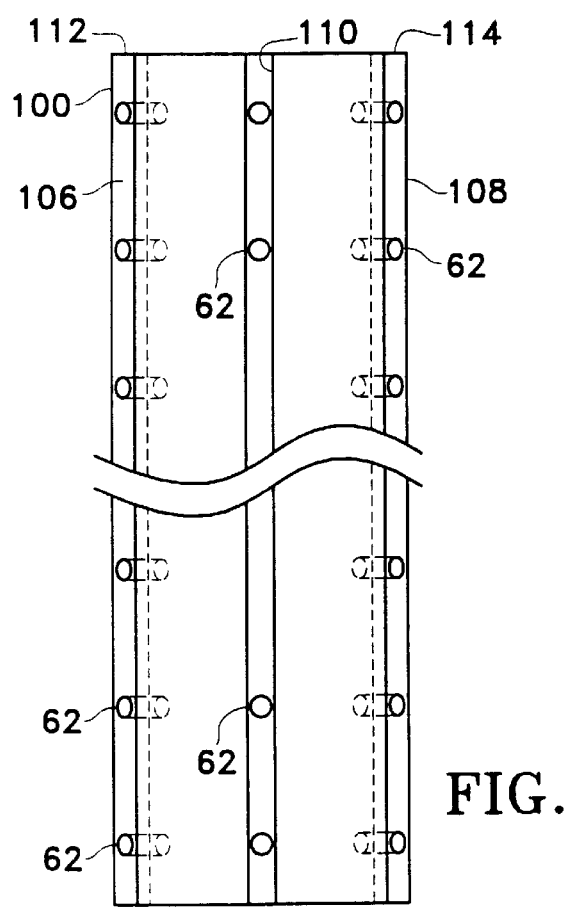
FIG. 12 is a side elevation of the intermediate post of FIG. 11.

Referring to FIGS. 11 and 12, there is shown an alternative embodiment of the convertor post of FIGS. 7 and 8. The alternative convertor post 100 of FIGS. 11 and 12 is an elongated member having a substantially rectangular cross section with a straight rear edge 102 without slot or bores, which allows it to be used along the rear of a furniture piece. The alternative convertor post 100 incudes the rear face 102, a front face 104, a left-hand face 106 and a right-hand face 108. An optional vertical longitudinal slot 110 is cut into the front face 104 midway between the left-hand face 106 and the right-hand face 108. A chamfered edge 112 is formed at the intersection of the left-hand face 106 and the front face 104 and a right-hand chamfered edge 114 is formed at the intersection of the front face 104 and the right-hand face 108, both at 45° to each of the respective intersecting faces. A plurality of vertically aligned bores 62 is drilled into the slot 110 and at each of the chamfered edges 112, 114, as described above. In use, the face 73 of the alternative convertor post 100 is fastened to either the left-hand face 57 or the rear face 55 of a corner post 24, to provide a slot 70 and a chamfered edge 66 along an otherwise flat face of the corner post 24. This allows panels or shelves to be attached along faces of the corner post 24 that would otherwise not accept these features.

Each of the members shown in FIGS. 5–12 thus have a vertical line of a plurality of bores 62, with each bore 62 in each line equally spaced, and with each line of bores 62 beginning and ending the same distance from the ends of each respective member. Therefore, if the members are, for example, vertical, each bore 62 on one member will align with a corresponding bore on all other members to form a horizontal line, as the members are shown in FIGS. 5–12, thereby allowing horizontal shelves, counter tops, and the like to be fastened to them. All bores 62 are horizontal as shown in FIGS. 5–12 and are perpendicular to the longitudinal axis of the various members and to the face of the members they are formed on. All slots are parallel to the longitudinal axis of the members they are formed in. All slots are optional and are used for retaining thin panels, such as the glass panels in 46 in FIG. 4, veneer panels, raised panels (e.g., 1.8 cm) with thin edges (e.g., 6 mm), and so forth. The longitudinal slots 58, 60, 70, 90, 92, 94 and 110 may run the entire length of a post, or they may be only as long as the panel to be installed in the grooves.

Still referring to FIGS. 5–12, all posts, that is, corner posts 24, corner post convertor members 64, intermediate posts 26, and alternative convertor posts 100 are made in lengths that are even integer multiples of 32 mm, with 2 mm then removed from each end ((X×32 mm)–4 mm), so that apertures 62 are evenly spaced 32 mm apart. The 2 mm excess at each end of each post is left for machining and reveal. The revel aids in leveling, particularly when two 38.4 cm posts are stacked on top of each other. The first aperture is 14 mm from the end of each post.

The Intermediate post 26 includes three columns of apertures 62, but the center column optionally may include only two apertures 62 spaced from each end as discussed above. It is not normally necessary to have apertures throughout the length of the post 26, as there will normally be a panel in the slot 94 and the apertures are for receiving cam-lock fasteners. If a single intermediate post 26 is made that is longer than the basic 38.4 cm post, such as a 76.8 cm post, then there will be two apertures 62 at each end as shown in FIG. 10, and two apertures equally spaced above and below the midpoint of the length of the intermediate post 26.

Figure 22:
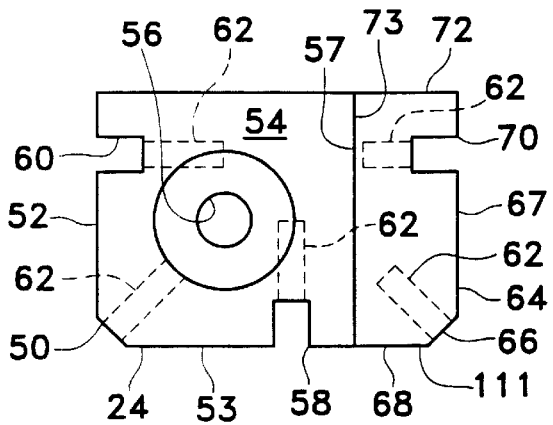
FIG. 22 is an end elevation of an alternative embodiment of the intermediate post of FIGS. 9 and 10 formed by fastening the convertor post of FIGS. 7 and 8 to the corner post of FIGS. 5 and 6.

Referring now to FIGS. 22–25, there are shown a number of variations of posts that are made by combining the corner post 24 or the intermediate post 26 with one or more corner post convertor members 64 or alternative convertor post 100. These variations increase the numbers of places that shelves 30 and panels 32 can be connected to a post, as shelves can be attached at various points along each chamfered edge. Referring to FIG. 22, there is shown an alternative embodiment intermediate post 111, which is formed by fastening a corner leg convertor member 64 and a corner post convertor member 64 together, with the rear face 73 of the corner post convertor member 64 fixed to either of the flat faces of the corner post 24, that is either the right-hand face 57 or the rear face 55, with the same shaped member being obtained in either case.

Figure 23:
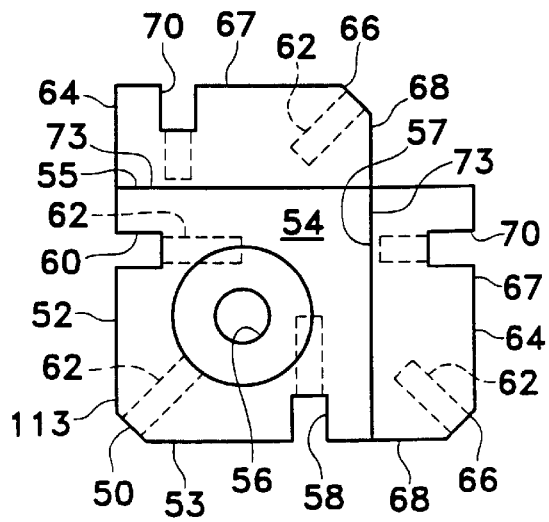
FIG. 23 an end elevation of a three-chamfered post formed by fastening a corner post convertor member of FIGS. 7 and 8 to each of the flat faces of the corner post of FIGS. 5 and 6.

Referring now to FIG. 23, there is shown a three-chamfered post 113 formed by fastening a corner post convertor member 64 to each of the flat faces 57, 55 of the corner post 24. The flat rear face 73 of a corner post convertor member 64 is aligned with each of the flat faces 55 and 57 of the corner post 24.

Figure 24:
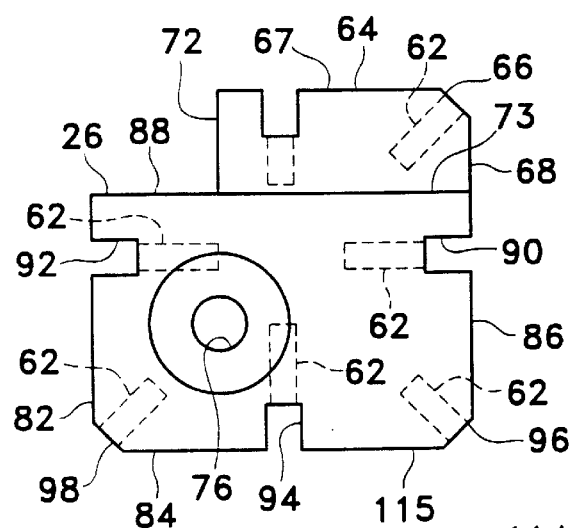
FIG. 24 is an end elevation of a three-chamfered intermediate post formed by fastening a corner post convertor member of FIGS. 7 and 8 to the flat face of the intermediate post of FIGS. 9 and 10.

Referring now to FIG. 24, a three-chamfered intermediate post 115 is formed by fastening a corner post convertor member 64 to an intermediate post 26. The rear face 88 of the corner post convertor member 64 is aligned with the rear face 73 of the intermediate post 26, with the left-hand face 68 of the corner post convertor member 64 aligned with the right-hand face 86 of the intermediate post 26, with the corner post convertor member 64 being rotated 180° from the position shown in FIG. 7.

Figure 25:
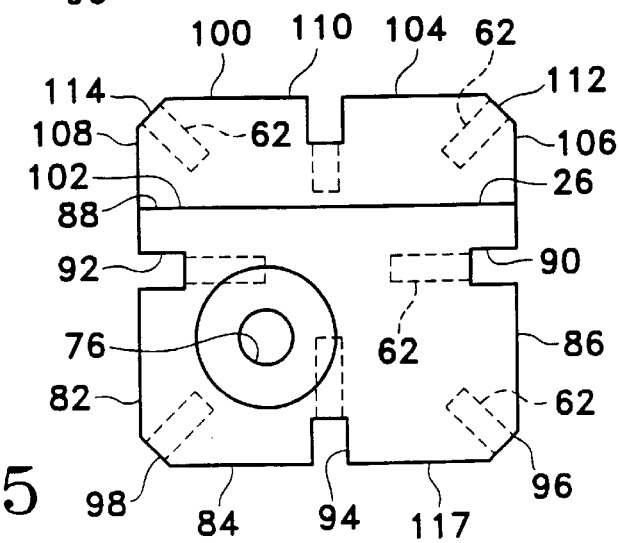
FIG. 25 is an end elevation of a four chamfered post formed by fastening the two flat faces of the intermediate post of FIGS. 9 and 10 and the alternative convertor post of FIGS. 11 and 12 together.

Referring now to FIG. 25, a four-chamfered post 117 is made by fastening an intermediate post convertor post, or alternative convertor post member 100, to an intermediate post 26, with the rear face 88 of the intermediate post 26 being aligned with the rear face 102 of the alternative post convertor member 100.

In regard to FIGS. 22–25, each post is formed of two or more separate posts fastened together by gluing, nailing, or other suitable means. The faces of each of the component members that are joined together are touching throughout their lengths. Each of the members shown in FIGS. 22–25 can also be formed from a single piece of material, a procedure that would reduce flexibility of the system.

Figures 13, 14:
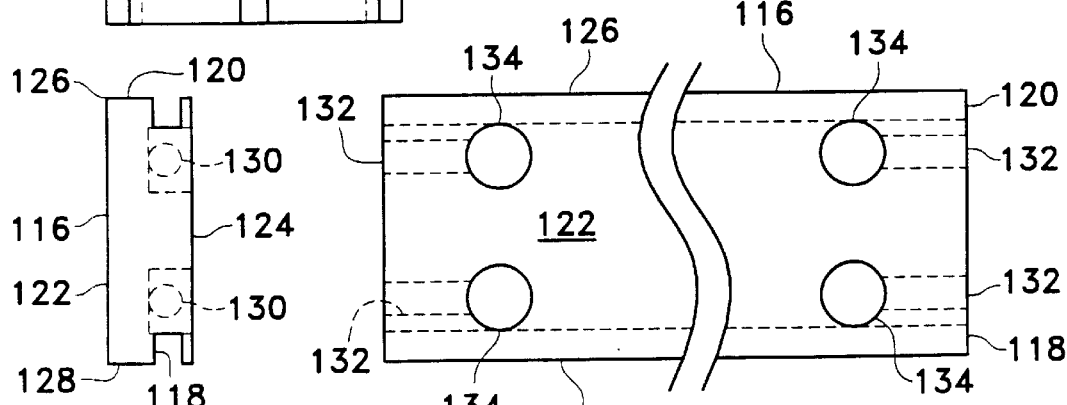
FIG. 13 is an end elevation of a rail member according to the present invention.
FIG. 14 is a side elevation of the rail member of FIG. 13.

Referring to FIGS. 13 and 14 there is shown a rail member 116, which is used as horizontal member to retain the edge of a panel in the lower slot 118 or the upper slot 120. The lower slot 118 and the upper slot 120 are preferably of the same width and have a width in the range of 3–9 mm, with the preferred width being 6 mm. The rail member 116 has a substantially rectangular cross section having a front or exterior finished edge 122, a rear or interior edge 124, a top edge 126 and a bottom edge 128. A separate fastening aperture 130 having an access tunnel 132 and a fastener bore 134 is located at each corner of the rail member 116, as best seen in FIG. 14.

Figure 17:
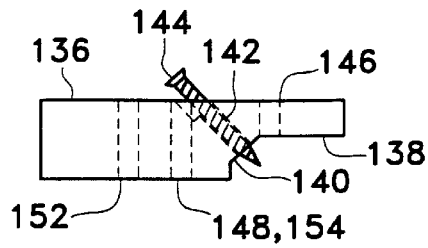
FIG. 17 is a front elevation of an adapter plate according to the present invention.
Figure 18:
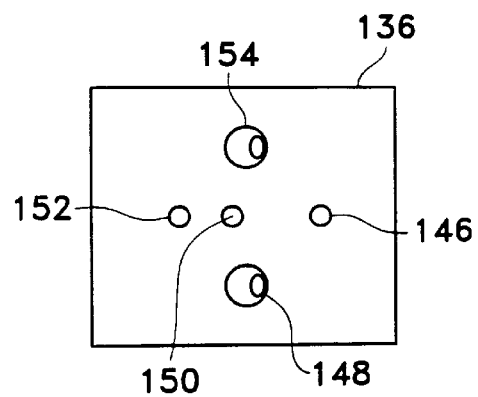
FIG. 18 is a top plan view of the adapter plate of FIG. 17.

Referring to FIGS. 17 and 18, there is shown an adaptor plate 136 that allows cabinet doors to be hung from post members 24, 26, and 100. The adaptor plate 136 has a substantially rectangular cross section (FIG. 17) having a notch portion 138, which further includes a diagonal portion 140 such that the notch portion 136 will mate with any cut-off corner of a post member 24, 26, or 100. Also included is a screw aperture 142, which retains the screw 144, which will fasten the adaptor plate 136 into any bore 62. The apertures 146, 148, 150, 152 and 154 are of a size and pattern to receive standard European style cabinet hinges.

Figure 15:
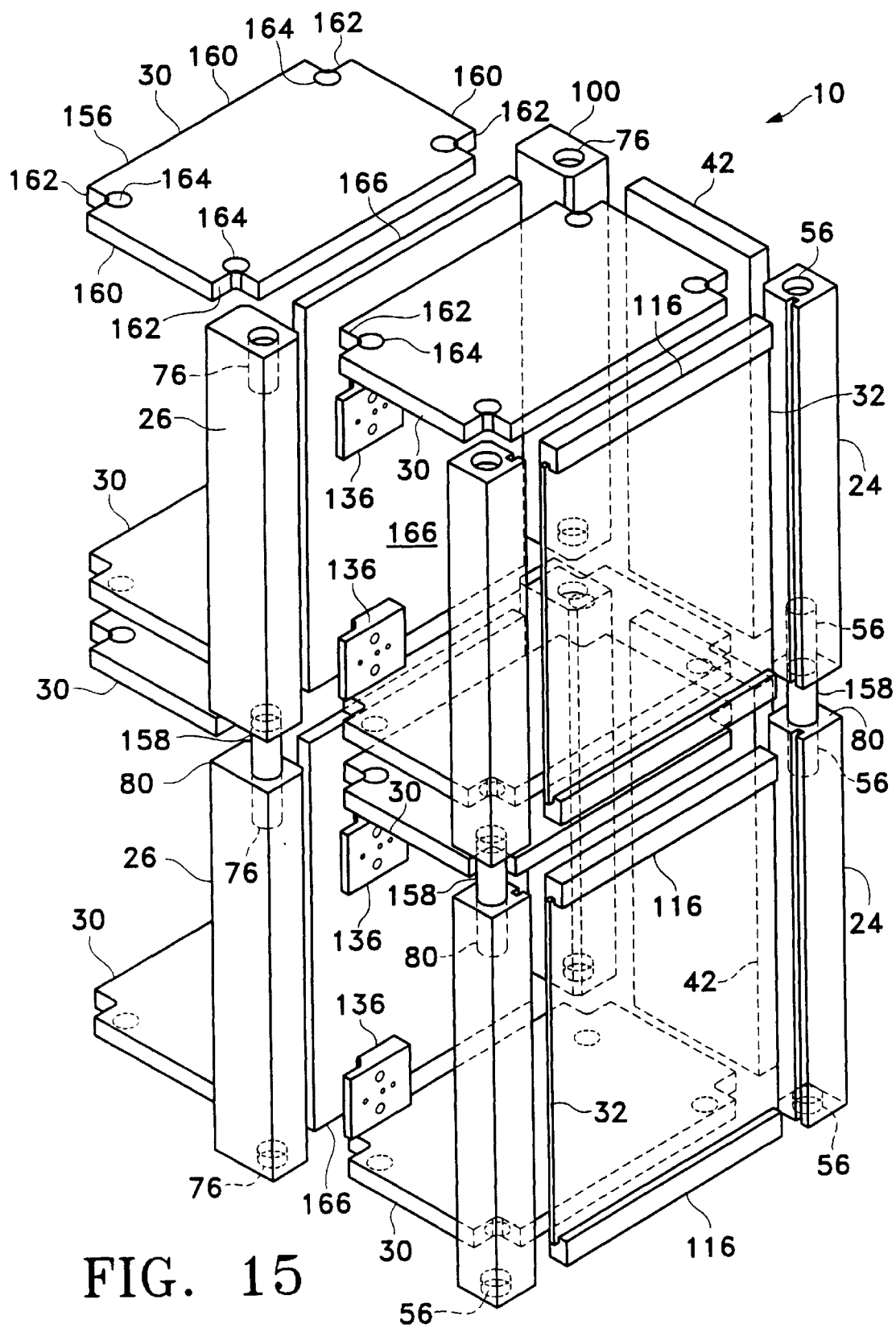
FIG. 15 is an exploded perspective view of a partially assembled cabinet according to the present invention.
Figure 20:
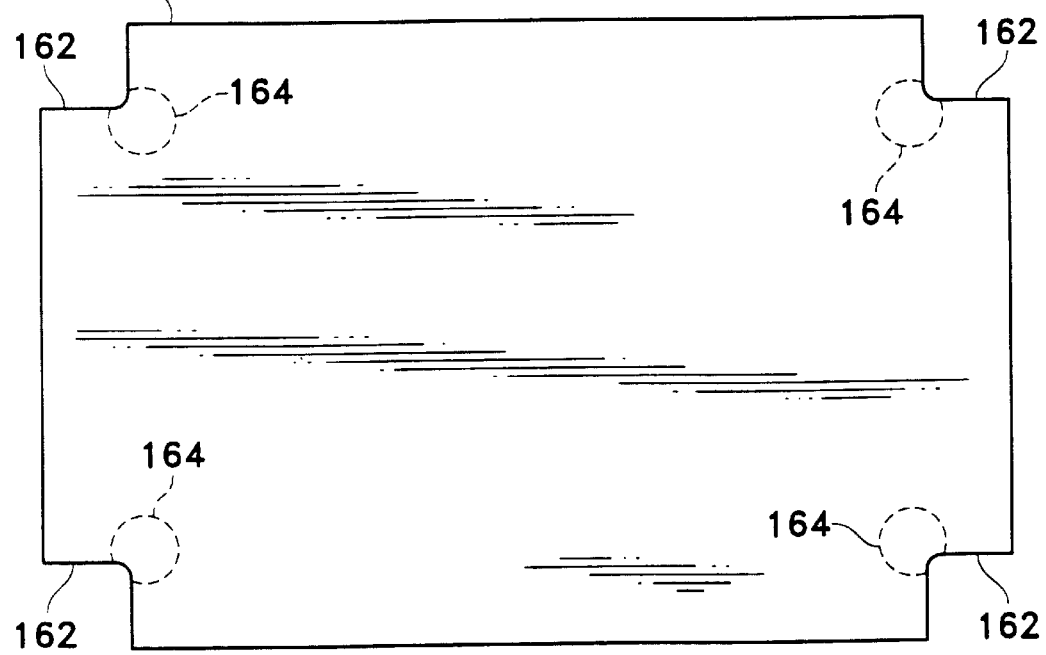
FIG. 20 is a top plan view of a shelf according to the present invention.
Figure 21:
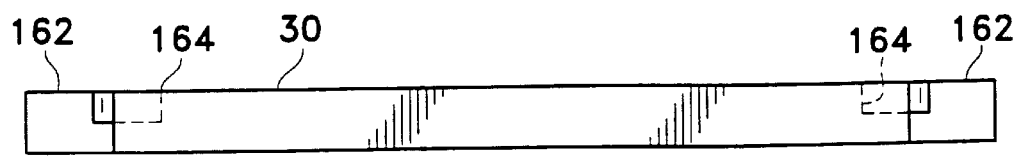
FIG. 21 is a side elevation of the shelf of FIG. 19.

Referring to FIG. 15, there is shown a partially assembled cabinet 156 illustrating how a furniture unit according to the present invention is built. Discussing the unit from right to left, a lower corner post and an upper corner post are connected by a connecting rod 158 that fits into the vertical bores 80 where it is retained by frictional engagement. This arrangement allows corner posts 24, intermediate posts 26, or alternative intermediate posts 100 to be stacked one on top of the other to form columns that are longer than single units, permitting relatively short posts to be use for large furniture units. The shelves 30 (as best seen in the upper left portion of FIG. 15, and in FIGS. 20 and 21, is substantially rectangular or square and includes four corners 160. At each corner is a square edged notch 162. A fastener bore 164 is formed partially through the shelf 30 adjacent to each corner notch 162 such that each fastener bore 164 intersects the associated notch 162. These fastener bores 164 accept standard cam operated fasteners that swing a latch member into a corresponding bore 62 in a post member. A panel member 32 is slid into the slots 118, 120 of a pair or rail members 116, which are then connected to adjacent corner posts 26. The panels 30 are thin rectangular sheets, such as wood, composite wood based material, glass, or the like. Alternatively, the rail members 116 and panels 30 exterior may be replaced with solid panels that are thicker, such as the rear panels 42. Any reasonably desired number of shelves 30 may be used and can be fastened into any of the desired vertically aligned bores 62 in the post members. Intermediate posts 26 or 100 are located between the outer ends of the assembled furniture to allow shelves 30 to be mounted on both the right-hand and left-hand sides of the intermediate posts 26 or 100. Between intermediate posts 26, that is from the front to the back of the furniture piece, a panels 166 are secured in the grooves or slots 110, if desired. These intermediate panels 166 can be omitted to provide an open cabinet interior if desired. The adaptor plates 136 are installed wherever it is desired to hang hinged doors drawers, or other standard 32 mm accessories. These adaptor plates 136 are actually installed by butting them against the corresponding post. The furniture unit can be expanded as much as desired by ganging intermediate posts 24, or 100 together with shelves between them.

Figure 16:
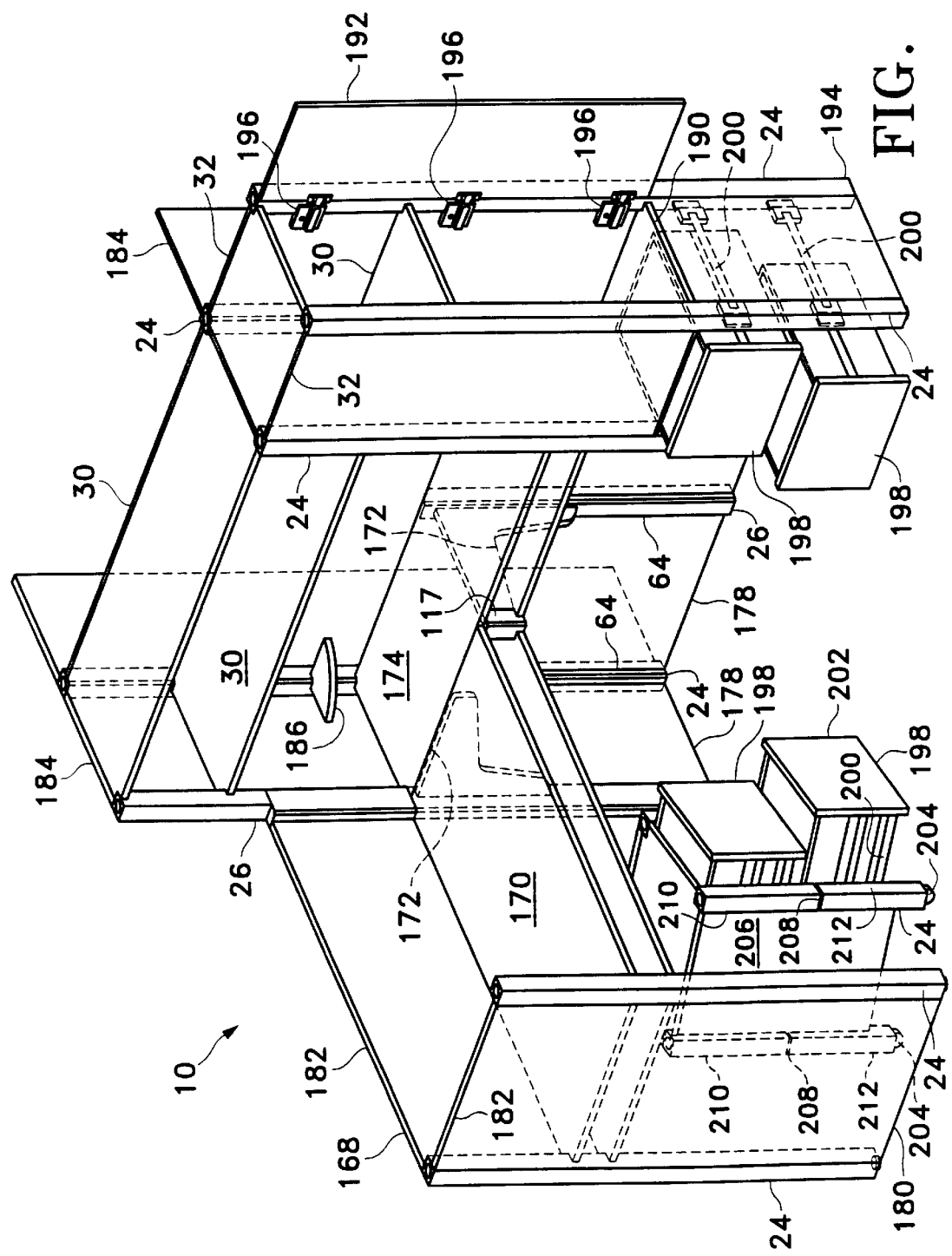
FIG. 16 is a perspective view of a work station according to the present invention.

Referring to FIG. 16, there is shown a work station 168, such as a modular computer work station, made according to the present system, having corner posts 24 that support the desk top 170 and the brace 172, which is secured to the intermediate post 26 at the right-hand end of the desk top 170 and by the perpendicularly disposed return desk top 174, which is also supported by separate corner posts 24 and intermediate posts 26. Modesty panels 178 under the front edge of both the desk top 170 and the return desk top 174 are held in place by cam-lock fasteners. And the end panel and front modesty panel 178 extend upwardly above the desk top 170 to provide privacy screens 182. The upwardly extended panels 184 provide end walls for two shelves 30, as described above. A fan-shaped small shelf 186 provides convenient storage for small items and is indicative of accessories that can be added in those locations.

Still referring to FIG. 16, a storage cabinet 188 attached to the right-hand side of the work station 168 includes four corner posts 24 having panels 32 cooperating with the panel 184 and all retained the slots 58, 60 in the corner posts 24 to enclose three sides of the cabinet 188, and a bottom shelf 190. A cabinet door 192 is attached to the corner post 194 by the European style hinges 196 and one or more shelves 30 are set into the cabinet 188. At the bottom of the cabinet, two file drawers 198 are mounted on conventional drawer rails 200, mounted on the adaptor plates 136. The adaptor plates 136 can be made of wood, plastic, molded metal, or the like, and can be formed as an integral portion of a rail member.

Still referring to FIG. 16, a filing cabinet 202 mounted on the casters 204, wheels, or glides and shown on the left-hand side of FIG. 16, includes two file cabinet drawers 198 mounted on drawer rails 200 (not visible in the drawing). Use of casters 204 mounted in the bores 56 of the corner posts 24 allow the file cabinet 200 to be moved from place-to-place. The modular design and flexibility of this system allows the file cabinet 202 to be made in individual modules, each having one or more drawers, which can be stacked to provide a filing cabinet any desired height. As shown, two file cabinet drawers 198 are each mounted in single modular cabinet units 206. The split-lines 208 show where separate upper corner posts 210 and lower corner posts 212 are joined together by a connecting rod 158.

Figure 19:
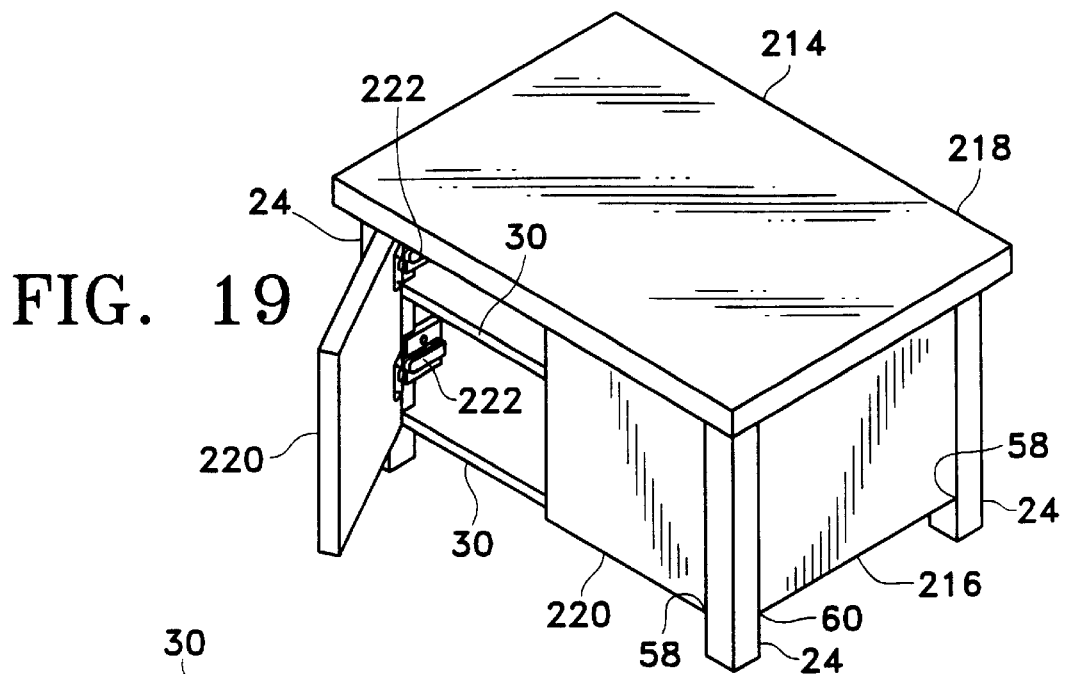
FIG. 19 is a perspective view of a cabinet made according to the present invention and showing the use of the adapter plate of FIG. 17.

Referring to FIG. 19, there is shown a cabinet 214 having four corner posts 24 with panels 216 on the left-hand side, right-hand side, and rear side fitted into the slots 58, 60 of the corner posts 24 to enclose three sides of the cabinet 214. Two shelves 30 are spaced and fastened inside the cabinet 214 as described above. A top 218 is attached to the top of the corner posts 24. A pair of cabinet doors 220 are mounted on the front of the cabinet by the hinges 222. Alternatively, one cabinet door may be replaced by an immovable panel.

The corner posts 24, intermediate posts 26, and the corner leg convertor member 64 are preferably made of hardwood, such as maple. Shelves 30 and thicker panels 42 and table tops, desk tops, and the like may be made of any suitable material that can be easily worked, is relatively inexpensive and is dimensionally stable, such as particle board. The corner fasteners are conventional cam-type fasteners commonly used in furniture. Panels 32 and other panels may be made of veneer woods, plastic, glass, or the like.

While the present invention has been described in accordance with the preferred embodiments thereof, the description is for illustration only and should not be construed as limiting the scope of the invention. Various changes and modifications may be made by those skilled in the art without departing from the spirit and scope of the invention as defined by the following claims.

I claim:

1. A modular furniture construction system comprising:
   a. at least two corner posts each said corner post further comprising an elongated member having a chamfered face along a juncture between two side faces of said corner post and a plurality of spaced bores along said chamfered face, said chamfered face forming an inner edge;
   b. at least one shelf having at least one corner, said corner having a notch adapted to receive said chamfered face and connected to said chamfered face of said corner posts by fittings adapted to fit said chamfered face inserted into said bores;
   c. means for connecting one end of one said corner post to one end another of said corner post to form a longer corner post;
   d. means for connecting one end of one said corner post to one end of another said corner post to form a longer corner post, thereby creating a taller modular furniture construction item; and
   e. a corner leg converter member comprising an elongated member having a rear face, a front face, a right-hand face, a left-hand face and a chamfered face between said front face and said left-hand face, a row of bores in said chamfered face, wherein said corner leg converter member is adapted to connect to a rear face or a right-hand face of a corner post to provide a means for supporting the corner of more than one shelf from the same corner post.

2. A modular furniture construction system in accordance with claim 1 wherein said shelf further comprises a rectilinear shelf having four corners, a notch at each corner adapted to receive said chamfered face, and a bore adjacent to each said notch for receiving and retaining a fitting for securing said shelf to said corner post.

3. A modular furniture construction system in accordance with claim 1 wherein said corner post further comprises a right-hand face, a left-hand face, a front face, and a rear face, a longitudinal vertical slot along each of a said faces and a row of bores in each said longitudinal slot, said bores adapted to receive and retain a fitting for securing a shelf.

4. A modular furniture construction system in accordance with claim 1 wherein said corner post further comprises a front face, a left-hand face, a rear face, and a right-hand face, wherein said chamfered face lies adjacent to said front face and said left-hand face, a first longitudinal slot along the length of said front face adjacent to said right-hand face, a second longitudinal slot along the length of said left-hand face adjacent to said rear face, and a row of bores in said first and second slots and along the length of said chamfered face, said bores adapted to receive and retain a fitting adapted to secure a shelf.

5. A modular furniture construction system in accordance with claim 1 further comprising at least one rail member connected to one said corner post, said rail member further comprising lower and upper longitudinal slots for receiving panels and a plurality of fastening bores.

6. A modular furniture construction system in accordance with claim 1 wherein said corner post connecting system further comprises a longitudinal bore along a centerline of said corner post in each end of said corner post and a rod inserted into said longitudinal bore of two adjoined corner posts.

7. A modular furniture construction system in accordance with claim 1 further comprising at least one intermediate post adapted to support one or more shelves from each of two sides, said intermediate post having a left-hand face connected to a first said shelf and a right-hand face connected to a second said shelf, said intermediate post being disposed between at least two said corner posts, with at least one corner post connected to said first shelf and at least one said corner post connected to said second shelf.

8. A modular furniture construction system in accordance with claim 7 wherein said intermediate post further comprises an elongated member having a rear face, a left-hand face, a front face and a right-hand face, a first chamfered face along the juncture of said front face and said right-hand face, said first chamfered face further comprising a row of spaced bores adapted to receive and retain a fitting for securing a shelf, a second chamfered face along the juncture of said front face and said left-hand face, said second chamfered face further comprising a row of spaced bores adapted to receive and retain a fitting for securing a shelf, a longitudinal slot along a centerline of said front face said front face slot further comprising a row of spaced bores adapted to receive and retain a fitting for securing a shelf, a longitudinal slot along the length of said right-hand face adjacent to said rear face, said right-hand face longitudinal slot further comprising a row of bores adapted to receive and retain a fitting for securing a shelf, and a longitudinal slot along the length of said left-hand face adjacent to said rear face, said left-hand longitudinal slot further comprising a row of bores adapted to receive and retain a fitting for securing a shelf, wherein said intermediate post is adapted to receive and retain a shelf along any of said rear, left-hand, front, right-hand, first chamfered, or second chamfered faces.

* * * * *